/ Patented Apr. 6, 1954

UNITED STATES PATENT OFFICE 2,674,569

PURIFICATION OF BENZENE HEXACHLORIDE BY STEAM DISTILLATION

Leslie James Burrage, Liverpool, and Catherine Reid Beveridge, Manchester, England, assignors to Imperial Chemical Industries Limited, a corporation of Great Britain No Drawing. Application April 30, 1946, Serial No. 666,192

Claims priority, application Great Britain April 30, 1945

5 Claims. (Cl. 202—46)

This invention relates to improvements in the production of benzene hexachloride and to compositions containing the benzene hexachloride so obtained.

In United States application Serial No. 502,828, now abandoned, there is described the production of pest control compositions which comprise benzene hexachloride or a solution thereof in close association with a carrier material or diluent which is a non-solvent for the benzene hexachloride under the conditions of use, said benzene hexachloride being prepared by the additive chlorination of benzene in the presence of actinic radiation and therefore containing a significant proportion i. e., at least 10 per cent of the gamma isomer. It is also stated that the chlorination of benzene in this manner, at an elevated temperature, produces a solution or a slurry of the benzene hexachloride in benzene, from which the benzene can be recovered in various ways, as for example by flashing off the solvent in hot water. A product obtained by the addition chlorination of benzene in such a manner consists almost entirely of a mixture of the known isomers of benzene hexachloride, and is conveniently referred to as crude benzene hexachloride.

Pest control compositions containing benzene hexachloride produced in this way are very effective for many purposes as for example in controlling or preventing flea beetle attacks on brassica crops, or in controlling locusts. However, they have the disadvantage that the crude benzene hexachloride has associated with it an odour which tends to make the pest control agents unsuitable for use in confined spaces. In samples of the material specially purified by lengthy recrystallation processes the odour is not nearly so noticeable, and it would appear, therefore, that the odour is to be attributed at least to a large extent to an impurity present in the material obtained by the normal processes.

We have now found that the odour associated with crude benzene hexachloride can be substantially reduced by submitting an aqueous suspension of the benzene hexachloride to steam distillation for a time insufficient to remove therefrom any substantial proportion of the benzene hexachloride.

According to the present invention, therefore, a process for the production of benzene hexachloride with diminished odour includes the step of subjecting an aqueous suspension of benzene hexachloride to steam distillation for a time insufficient to remove therefrom any substantial proportion of the benzene hexachloride. Advantageously the process comprises adding a solution or slurry of benzene hexachloride in benzene to water maintained at a temperature near its boiling point, the benzene thus being rapidly vaporised, and subjecting the resultant aqueous suspension of benzene hexachloride to steam distillation.

It is known that alpha-benzene hexachloride is volatile in steam while the beta-isomer is not volatile, and this property of alpha-benzene hexachloride has been used to separate mixtures of the alpha- and beta-isomers. However, the present process is not concerned with a treatment sufficiently prolonged to remove any substantial proportion of the alpha-isomer, so that when the treatment is complete the proportions of the isomers present in the treated material are not significantly different from those in the untreated crude benzene hexachloride. However, when the treated benzene hexachloride is to be used for pest control purposes, the removal of small amounts of the alpha-isomer is not disadvantageous.

In one form of the invention dry crude benzene hexachloride in finely divided condition is suspended in water, and steam is passed into the suspension. The amount of water with which the crude benzene hexachloride is originally mixed is not of great importance, providing that enough is used to give a mobile mixture. As the introduction of steam is carried out the temperature of the mixture will rise until the water boils at a temperature dependent upon the pressure conditions existing and the steam distillation will then commence. Suitably the steam distillation is carried out for a time of the order of 1 to 6 hours, for example 3 hours. After the introduction of steam has been stopped, the benzene hexachloride is recovered from the mixture with water by settling and decantation, filtration, centrifuging, or by any other suitable means.

Instead of treating dry crude benzene hexachloride the process may also be applied to fractions obtained from the crude benzene hexachloride which contain an enhanced proportion of the gamma-isomer, for example fractions which may be obtained by the process as described in United States Patent No. 2,438,900, United States application Serial Nos. 594,590, now Patent No. 2,502,258, 537,372, now abandoned, and 4,708, now Patent No. 2,553,956, and British application No. 3,435/45. British patent specification No. 573,693 corresponding to United States application Nos. 537,372 and 4,708 teach that an enhanced proportion of the gamma isomer in benzene hexachloride may be obtained by extracting the crude benzene hexachloride with methanol or ethanol in such amount as to dissolve the gamma isomer and leave a substantial proportion of the alpha isomer undissolved.

The process of the present invention may also be applied with advantage to the production of crude benzene hexachloride by the method in which a solution or a slurry of benzene hexachloride in unchanged benzene is contacted with hot water to remove by rapid vaporisation the unchanged benzene. Thus, after the benzene has been removed in this manner steam may be passed into the resultant suspension for a suitable time of the order of 3 hours before recovering the crude benzene hexachloride from its mixture with water. We have found that in carrying out the process in this way the temperature of the water to which the benzene hexachloride solution or slurry is added has a considerable effect on the efficiency of the subsequent deodorisation treatment. Thus, while the process can be operated when the vaporisation of the benzene has been effected with the water maintained at a temperature as low as, say, 80° C., it is surprising to find that markedly improved results are secured and the deodorisation process is hastened if the water is maintained, during the vaporisation of the benzene, at a temperature not greatly different from boiling point, for example between 95° C. and the boiling point under the existing pressure conditions.

In the preferred method of carrying out the invention, therefore, a solution or slurry of benzene hexachloride in benzene is added to a considerable volume of water maintained at or near the boiling point, the rate of addiiton being regulated so that the temperature of the water does not fall even temporarily below approximately 95° C.; suitably the water is maintained at boiling point by passing live steam into it continuously or periodically during the addition of the benzene hexachloride. Benzene will be vaporised substantially instantaneously on contacting the boiling water and can be condensed with the steam which will also be formed and the condensate may be allowed to settle into layers and the benzene layer separated. After all the solution or slurry has been added and the unchanged benzene has been vaporised, steam is passed into the remaining aqueous suspension of benzene hexachloride for a suitable time, of the order of 2 to 3 hours or longer. At the end of this time the introduction of steam is stopped, and the benzene hexachloride is separated by decantation or filtration and dried.

The preferred method, described above, is advantageously applied to a solution or slurry of crude benzene hexachloride as obtained directly by the additive chlorination of benzene in the presence of actinic radiation. If desired, however, fractions containing an enhanced proportion of the gamma isomer may also be treated by this method.

The product obtained by the process of this invention has a substantially reduced odour as compared with benzene hexachloride which has not been so treated. The deodorised benzene hexachloride so obtained may be used in the preparation of pest control compositions such as those described in United States application Serial Nos. 502,828, 586,433, now Patent No. 2,452,604, 582,042, now Patent No. 2,652,623, and 634,141, now abandoned, and in British applications Nos. 8,512/44, 16,262/44, and 3,436/45.

The following example illustrates but does not limit the invention, all parts being by weight.

*Example*

500 parts of water were placed in a vessel provided with a mechanical stirrer, a steam inlet tube, an inlet for benzene hexachloride solution or slurry, and a thermometer tube having a side arm connected to a condenser. The water was heated to 100° C., then the introduction of steam was started, and 986 parts of a solution of crude benzene hexachloride in benzene, which had been prepared by chlorinating benzene in the presence of actinic radiation and which contained approximately 20% by weight of benzene hexachloride, was added gradually to the agitated water. The addition was completed in 1 hr. 35 min., the temperature being maintained at 100° C. throughout. During the addition, the benzene vaporised continuously as the solution contacted the boiling water; the benzene was condensed, 712 parts being recovered. After the addition was complete, the steam distillation was continued for a further period of six hours, and the benzene hexachloride was then separated from the water by filtration and dried. 175 parts of dry benzene hexachloride were obtained, and the product was found to have a very much reduced odour as compared with that of the crude material.

We claim:
1. A process for the production of benzene hexachloride with diminished odour which comprises adding a slurry of crude benzene hexachloride in benzene, obtained directly by the additive chlorination of benzene in the presence of actinic radiation, to water maintained at a temperature approximating to its boiling point, whereby the benzene is rapidly vaporised, and subjecting the resultant aqueous suspension of crude benzene hexachloride to steam distillation for a period of 2 to 3 hours.

2. A process for the production of benzene hexachloride with diminished odor which includes the step of subjecting an aqueous suspension of a finely divided benzene hexachloride containing at least 10% of the gamma isomer to steam distillation for a period of between 1 and 6 hours.

3. A process for the production of benzene hexachloride with diminished odor which includes the step of subjecting an aqueous suspension of a finely divided crude benzene hexachloride, said crude benzene hexachloride being the total mixture of benzene hexachloride isomers obtained by the additive chlorination of benzene in the presence of actinic radiation, to steam distillation for a period of between 1 and 6 hours.

4. A process for the production of benzene hexachloride with diminished odor which includes the step of subjecting to steam distillation for a period of between 1 and 6 hours an aqueous suspension of a finely divided benzene hexachloride fraction of crude benzene hexachloride, said crude benzene hexachloride being the total mixture of isomers obtained by the additive chlorination of benzene in the presence of actinic radiation and containing at least 10 per cent of the gamma isomer, and said fraction of crude benzene hexachloride having an enhanced gamma isomer content relative to the gamma isomer content of said crude benzene hexachloride.

5. In the production of a benzene hexachloride product containing at least about 10% gamma isomer of benzene hexachloride, by a method in which benzene is chlorinated, the step of improving the quality of the benzene hexachloride material produced that comprises subjecting such material substantially free of benzene to treatment with water at a temperature of at least about 80° C. for a period of at least about one hour.

References Cited in the file of this patent

Van Der Linden, "Ber. Deut. Chem.," vol. 45, p. 232 (1912).

Van Der Linden, Ber. Deut. Chem. Gesellschaft, vol. 45, pps. 231–247 (1912).

Matthews, "The Alpha and Beta Modifications of Benzene Hexachloride," Journal of the Chemical Society of London, Transactions, vol. 59, pps. 165–172.

Badger and McCabe, Elements of Chemical Engineering, second edition, published 1936 by McGraw Hill Book Co., Inc., New York, N. Y.